UNITED STATES PATENT OFFICE 2,315,835

CONDENSATION PRODUCTS OF 1-AMINO-ARYL-5-PYRAZOLONE-4-SULPHONIC ACIDS

Paul Zervas, Cologne-Mulheim, Germany, assignor to General Aniline & Film Corporation, New York, N. Y., a corporation of Delaware No Drawing. Application August 9, 1941, Serial No. 406,240. In Germany June 8, 1939

6 Claims. (Cl. 260—310)

The present invention relates to condensation products of 1-aminoaryl - 5 - pyrazolone-4 - sulphonic acids and to a method of preparing the same. More particularly it relates to products of the general formulae

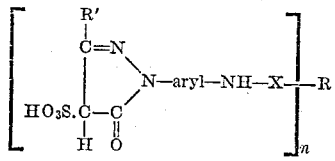

and

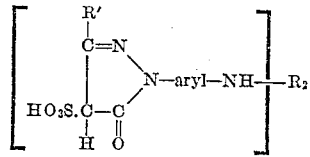

In these formulae X stands for CO, $SO_2$, COO or CONH, R stands for aryl or alkyl, R' stands for alkyl or COOH, $R_2$ stands for aryl or alkaryl, and $n$ stands for 1 or 2.

The new products are obtainable by reacting the amino group of 1-aminoaryl-5-pyrazolone-4-sulphonic acids with organic compounds containing one or more replaceable halogen or nitro groups; if desired or necessary, the reaction products thus obtained can be subjected to further changes. A splitting off of the sulphonic acid group in the 4-position, however, does not take place during these operations.

The 1-aminoaryl-5 - pyrazolone - 4 - sulphonic acids employed are described and claimed in my copending application Ser. No. 406,239 (entitled "1-aminoaryl-5-pyrazolone -4- sulphonic acids"). As suitable compounds containing one or more replaceable halogen or nitro groups may be used, e. g., phosgene, cyanuric chloride, choloroformic esters; alkylhalides, mono- and dicarboxylic acid chlorides, sulphonic acid chlorides as well as ortho-nitrochlorobenzenes, ortho-dinitrobenzenes and the sulphonic or carboxylic acids thereof. The condensation is effected in aqueous medium at an alkaline to weakly acid reaction.

These new condensation products or the conversion products thereof are valuable intermediates. They will be used for the synthesis of new dyestuffs hitherto not accessible.

According to this invention it is now possible to react aminoarylpyrazolones i. e. 1-aminoaryl-5-pyrazolone-4-sulphonic acid in aqueous medium and in the proportions required by theory with reactive compounds to form the corresponding condensation products. In the case of the ordinary aminoarylpyrazolones, i. e. aminoarylpyrazolones containing no sulphonic acid group in the 4-position, the reaction with reactive compounds takes place as a rule only in organic solvents such as pyridine; in few cases only is the reaction in aqueous medium possible. However, also when working in organic solvents the use of the reaction components in molecular proportions, i. e. 1:1, yields only an incomplete conversion of the aminoarylpyrazolones to the desired condensation product; in order to obtain a complete change the compounds having the reactive groups e. g. acid chlorides have to be used in quantities up to 2 molecular proportions.

The following examples illustrate the invention without, however, limiting it thereto, the parts being by weight.

Example 1

26.9 parts of 1-(4'-aminophenyl) -3-methyl-5-pyrazolone-4-sulphonic acid are dissolved in 100 parts of water with sodium carbonate to a neutral solution to which 14 parts of crystallized sodium acetate are added. Thereto a solution of 18.6 parts of 4-nitrobenzoyl chloride in a small quantity of benezne is added drop by drop at 40–50° C.; the reaction mixture is stirred for about 2 hours until the condensation is complete and the precipitated condensation product is filtered with suction. Yield almost quantitative. It is reduced in the usual manner with iron filings and acetic acid to 1-[4'-(4''-aminobenzoylamino)-phenyl]-3-methyl-5-pyrazolone-4 - sulphonic acid:

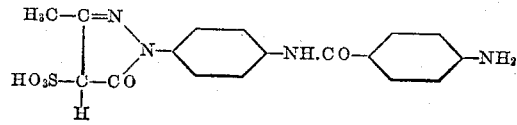

If, instead of 1-(4'-aminophenyl) -3-methyl-5-pyrazolone-4-sulphonic acid, 1-(3'-aminophenyl) -3-methyl-5-pyrazolone-4-sulphonic acid or 1-(3'-or 4'- aminophenyl - 5-pyrazolone - 3 - carboxylic acid-4-sulphonic acid is used as starting material and condensation and reduction are carried out as above the corresponding condensation products are obtained. It is a matter of course that instead of the 4-nitrobenzoyl chloride in all these cases in exactly the same manner 3-nitrobenzoyl chloride can be used; the end-products then contain the nitro- or the amino-group in the 3-position of the benzene nucleus of the above formula and the corresponding formulae.

Example 2

26.9 parts of 1-(4'-aminophenyl)-3-methyl-5-pyrazolone-4-sulphonic acid are condensed with 26.2 parts of 4-nitrodiphenyl-4'-carboxylic acid chloride and reduced in the manner of Example 1. Yield almost quantitative. The 1-[4'-(4''-aminodiphenyl-4'''- carboylamino) - phenyl] - 3-methyl-5-pyrazolone-4-sulphonic acid:

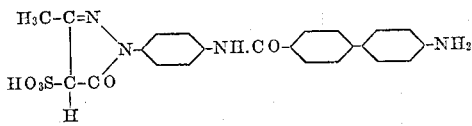

is obtained.

Example 3

26.9 parts of 1-(4'-aminophenyl)-3-methyl-5-pyrazolone-4-sulphonic acid are dissolved as stated in Example 1 and condensed with 20.7 parts of 2.3-hydroxynaphthoic acid chloride in the presence of 14 parts of crystallized sodium acetate at 40–50° C. When the reaction is finished the precipitated condensation product is isolated. It corresponds in the free state to the following formula:

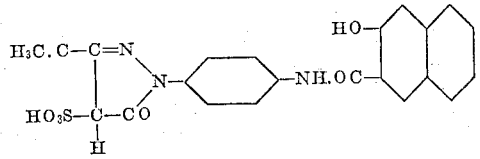

Yield about 70 per cent of the theory.

Example 4

53.8 parts of 1-(4'-aminophenyl)-3-methyl-5-pyrazolone-4-sulphonic acid are condensed with 20.3 parts of benzene-1.4-dicarboxylic acid chloride as stated in Example 1. The precipitated and isolated condensation product corresponds in the free state to the following formula:

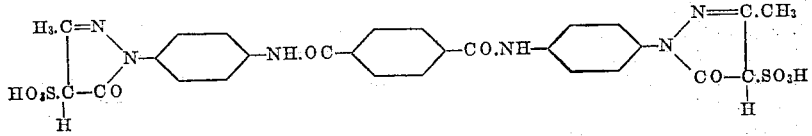

Yield about 85 per cent of the theory.

If, instead of 1-(4'-aminophenyl)-3-methyl-5-pyrazolone-4-sulphonic acid, 1-(3'-aminophenyl)-3-methyl-5-pyrazolone-4 - sulphonic acid is used or, instead of benzene-1.4-dicarboxylic acid chloride the benzene-1.3-dicarboxylic acid chloride, corresponding condensation products are obtained.

Example 5

26.9 parts of 1-(4'-aminophenyl)-3-methyl-5-pyrazolone-4-sulphonic acid are dissolved to a neutral solution according to Example 1 and 14 parts of crystallized sodium acetate are added. Thereto an alcoholic solution of 20.3 parts of 2.4-dinitro-1-chlorobenzene is added and the reaction mixture is stirred with heating to 70–80° C., until the condensation is complete. The yellow-red condensation product precipitated after cooling is isolated and freed from a small quantity of admixed dinitrochlorobenzene by redissolving and precipitating. It corresponds in the free state to the following formula:

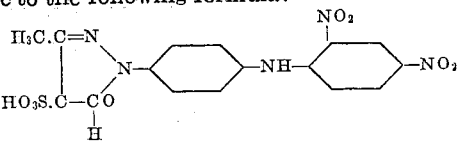

Yield about 73 per cent of the theory.

In a similar manner corresponding condensation products are obtained by using 1-chloro-2.4-dinitrobenzene-6-sulphonic acid or 2-chloro-5-nitrobenzene-1-carboxylic acid.

Example 6

A neutral solution of 53.8 parts of 1-(4'-aminophenyl)-3-methyl-5-pyrazolone-4-sulphonic acid is allowed to run at 25–30° C. into a suspension of 18.5 parts of cyanuric chloride in aqueous acetone. By adding sodium carbonate the mixture which is acid to Congo red paper, is rendered weakly alkaline. The precipitated condensation product is isolated; it corresponds in the free state to the following formula:

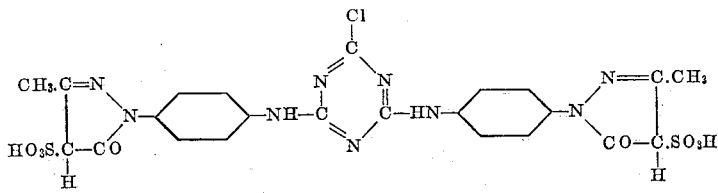

Yield about 85 per cent of the theory.

Example 7

26.9 parts of 1-(4'-aminophenyl)-3-methyl-5-pyrazolone-4-sulphonic acid are dissolved according to Example 1. Into the solution of about 50° C. in which an alkaline reaction is maintained by adding sodium carbonate solution phosgene is passed, until a test portion can no longer be diazotized. The condensation product formed precipitates by adding sodium chloride. Yield about 80 per cent of the theory. It corresponds in the free state to the following formula:

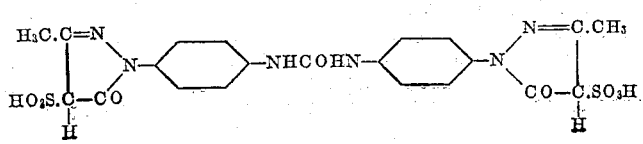

If, instead of 1-(4'-aminophenyl)-3-methyl-5-pyrazolone - 4 - sulphonic acid, 1-(3'-aminophenyl)-3-methyl-5-pyrazolone - 4 - sulphonic acid or 1-(3'-aminophenyl)-5-pyrazolone - 3 - carboxylic acid-4-sulphonic acid is used, the corresponding condensation products are obtained.

Example 8

26.9 parts of 1-(4'-aminophenyl)-3-methyl-5-pyrazolone-4-sulphonic acid are dissolved to a neutral solution according to Example 1 and 14 parts of crystallized sodium acetate are added. To this solution 15.7 parts of phenyl chloroformate are slowly added at about 25–30° C. When neutralizing with sodium carbonate solution the condensation product precipitates with a yield of about 82 per cent of the theory. It corresponds in the free state to the following formula:

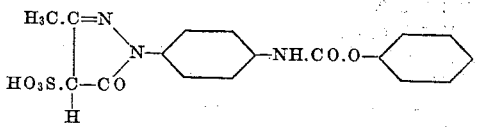

If, instead of 1-(4'-aminophenyl)-3-methyl-5-pyrazolone-4-sulphonic acid, 1 - (3'-aminophenyl)-3-methyl-5-pyrazolone-4-sulphonic acid or 1-(3'-aminophenyl)-5-pyrazolone - 3 - carboxylic acid-4-sulphonic acid or instead of the phenyl chloroformate methyl or ethyl chloroformate are used, the corresponding condensation products are obtained.

Example 9

26.9 parts of 1-(4'-aminophenyl)-3-methyl-5-pyrazolone-4-sulphonic acid are dissolved as stated in Example 1 and condensed at 60–70° C. with 23.7 parts of 1-hydroxybenzene-2-carboxylic acid-4-sulphochloride at a reaction weakly alkaline with sodium carbonate. The condensation product thus obtained is precipitated from the neutralized solution by adding sodium chloride. It corresponds in the free state to the following formula:

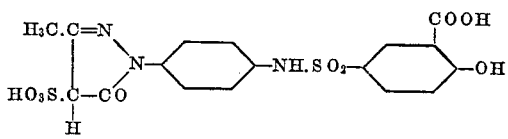

Yield about 65 per cent of the theory.

Example 10

26.9 parts of 1-(4'-aminophenyl)-3-methyl-5-pyrazolone-4-sulphonic acid are dissolved according to Example 1; thereto are added at about 10° C. 11.3 parts of chloracetyl chloride and 65 parts of a 20 per cent solution of sodium carbonate to keep the reaction just alkaline. The condensation product precipitates with a yield of about 80 per cent of the theory by adding sodium chloride. It corresponds in the free state to the following formula:

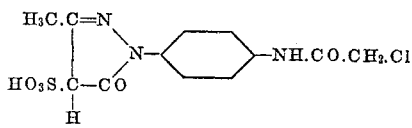

If, instead of 1-(4'-aminophenyl)-3-methyl-5-pyrazolone-4 - sulphonic acid, 1-(3'-aminophenyl)-3-methyl-5-pyrazolone-4 - sulphonic acid or 1-(3'-amino)-5-pyrazolone-3-carboxylic acid - 4 - sulphonic acid or instead of chloracetyl chloride another acid chloride of the aliphatic series is used, the corresponding condensation products are obtained.

Example 11

26.9 parts of 1-(4'-aminophenyl)-3-methyl-5-pyrazolone-4-sulphonic acid are dissolved as stated in Example 1 and mixed with 14 parts of crystallized sodium acetate. Thereto 13 parts of benzyl chloride are added and the mixture is stirred at 50° C. for several hours, until the condensation is complete. The condensation product corresponds in the free state to the following formula

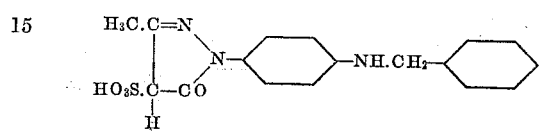

Yield about 70 per cent of the theory.

If, instead of 1-(4'-aminophenyl)-3-methyl-5-pyrazolone-4 - sulphonic acid, 1-(3'-aminophenyl)-3-methyl-5-pyrazolone-4 - sulphonic acid or 1-(3'-aminophenyl)-5-pyrazolone - 3 - carboxylic acid-4-sulphonic acid or instead of benzyl chloride 4-nitrobenzyl chloride is used, the corresponding condensation products are obtained.

Example 12

26.9 parts of 1-(4'-aminophenyl)-3-methyl-5-pyrazolone-4-sulphonic acid are dissolved according to Example 1 and to this solution 20.2 parts of 3.4-dinitrochlorobenzene dissolved in a small quantity of alcohol, and 12 parts of calcium carbonate are added. This reaction mixture is heated with stirring to about 70–80° C. for about 20 hours, filtered with suction and the condensation product is isolated from the red-brown filtrate with a yield of about 80 per cent of the theory. It corresponds in the free state to the following formula:

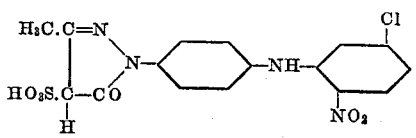

I claim:

1. The new products corresponding to the general formula:

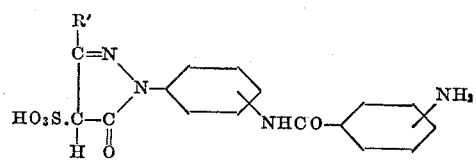

wherein R' stands for a radical selected from the group consisting of alkyl and COOH.

2. The new product corresponding in the free state to the formula:

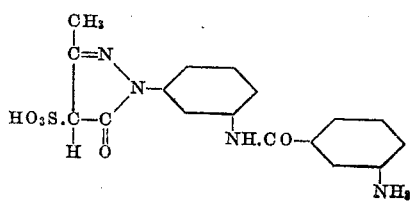

3. The new product corresponding in the free state to the formula:

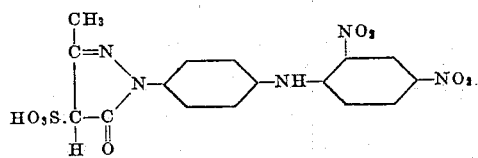

4. The new product corresponding in the free state to the formula:

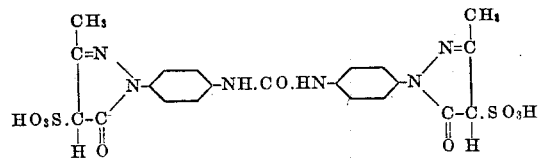

5. Process of preparing condensation products of 1-aminophenyl-5-pyrazolone-4-sulphonic acids which comprises reacting the amino group of 1-aminophenyl-5-pyrazolone-4-sulphonic acids with organic compounds containing replaceable halogen groups while splitting off the halogen acid.

6. The new products selected from the group consisting of those having the following general formulae:

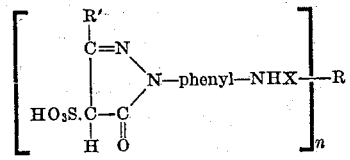

and

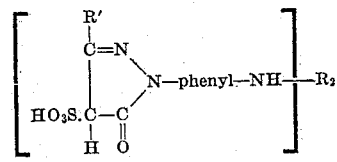

wherein X stands for a radical of the group consisting of CO, $SO_2.COO$, and CONH radicals; R stands for a member of the group consisting of aryl and alkyl groups; R' stands for a radical selected from the group consisting of alkyl and COOH; $R_2$ stands for a member of the group consisting of aryl and alkaryl and $n$ stands for one of the values 1 and 2.

PAUL ZERVAS.